United States Patent
Tanabe

(10) Patent No.: US 9,294,747 B2
(45) Date of Patent: Mar. 22, 2016

(54) DISPLAY APPARATUS, INFORMATION PROCESSING APPARATUS, IMAGE DISPLAY SYSTEM, DISPLAY APPARATUS CONTROL METHOD AND INFORMATION PROCESSING APPARATUS CONTROL METHOD

(75) Inventor: Akihiro Tanabe, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 719 days.

(21) Appl. No.: 13/272,321

(22) Filed: Oct. 13, 2011

(65) Prior Publication Data

US 2012/0113149 A1    May 10, 2012

(30) Foreign Application Priority Data

Nov. 4, 2010  (JP) ................................. 2010-247835

(51) Int. Cl.
  *H04N 9/31*  (2006.01)
  *G09G 5/14*  (2006.01)

(52) U.S. Cl.
  CPC ............. *H04N 9/3188* (2013.01); *G09G 5/14* (2013.01); *G09G 2340/0407* (2013.01); *G09G 2340/0442* (2013.01)

(58) Field of Classification Search
  CPC .......................... G09G 5/14; H04N 9/3188
  See application file for complete search history.

(56) References Cited

FOREIGN PATENT DOCUMENTS

| CN | 1194537 A    | 9/1998 |
|----|--------------|--------|
| CN | 1476242 A    | 2/2004 |
| JP | 2004-054134  | 2/2004 |
| JP | 2004-128778 A| 4/2004 |

OTHER PUBLICATIONS

Network Technologies Incorporated. "SPLITMUX-DVI-4 Quad Screen Video Splitter Installation and Operation Manual" Sep. 7, 2007.*
ViewSonic, "User Guide; ViewSonic WPG-350 Wireless Presentation Gateway," 2009.*
"Manual—TeamViewer 5.1", Manual for Software Product TeamViewer released on Sep. 21, 2010, Retrieved from https://www.teamviewer.com/download/version_5x/teamviewer_manual.pdf on Jul. 9, 2015.*
Mar. 3, 2014 Japanese Office Action that issued in Japanese Patent Application No. 2010-247835.
Apr. 2, 2014 Chinese Office Action that issued in Chinese Patent Application No. 201110346324.7.

* cited by examiner

*Primary Examiner* — Zhengxi Liu
(74) *Attorney, Agent, or Firm* — Cowan, Liebowitz & Latman, P.C.

(57) ABSTRACT

A display apparatus which displays image data sent from a plurality of information processing apparatuses via a communication line determines which of (1) image data sent from the same information processing apparatus and (2) image data sent from different information processing apparatuses are a plurality of received image data. Depending on the determination result, the display apparatus changes the display layout.

16 Claims, 11 Drawing Sheets

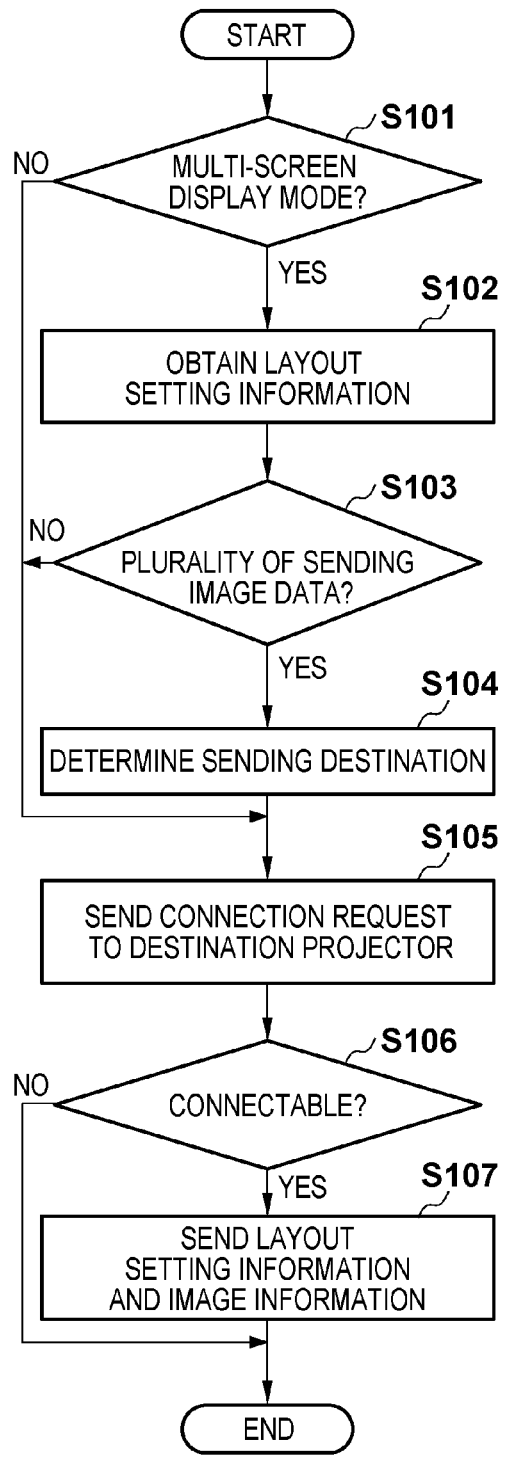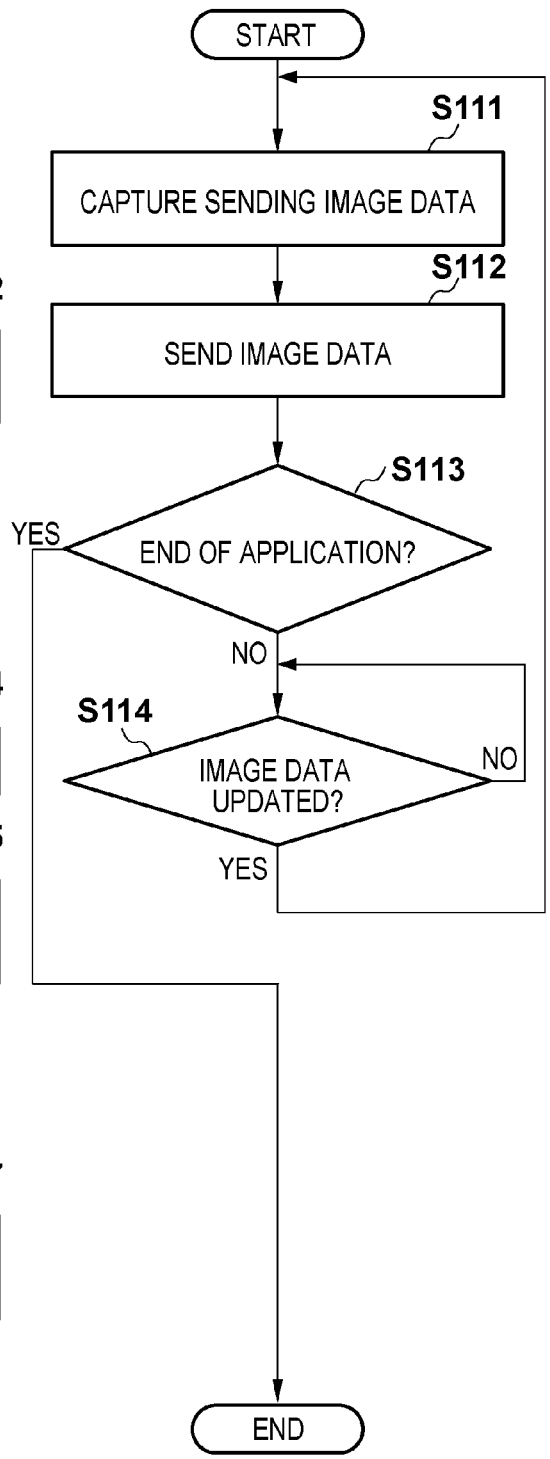
FIG. 3A
FIG. 3B

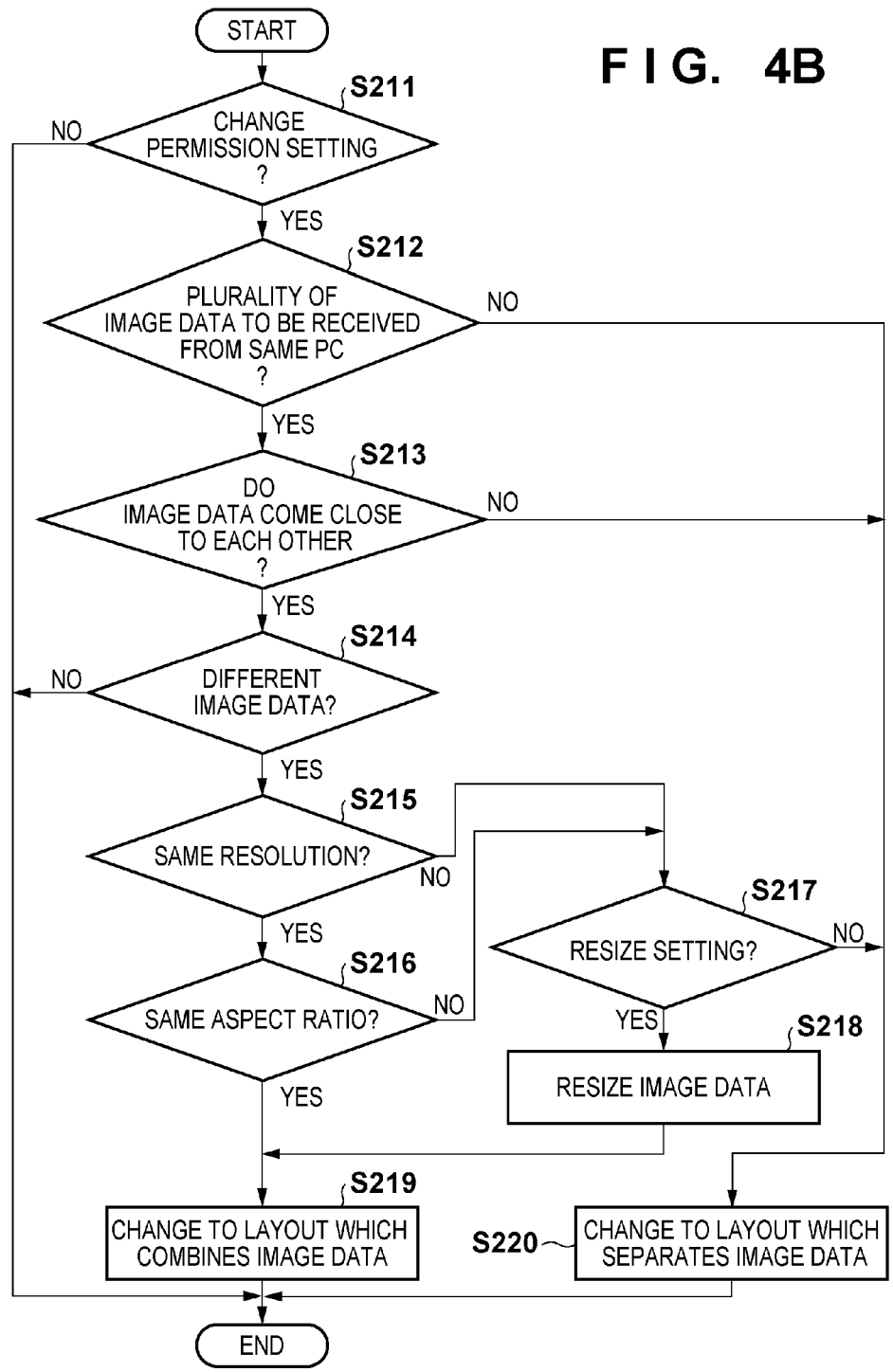

DISPLAY APPARATUS, INFORMATION PROCESSING APPARATUS, IMAGE DISPLAY SYSTEM, DISPLAY APPARATUS CONTROL METHOD AND INFORMATION PROCESSING APPARATUS CONTROL METHOD

BACKGROUND OF THE INVENTION

1. Field of the Invention

The present invention relates to a display apparatus, information processing apparatus, image display system, display apparatus control method and information processing apparatus control method.

2. Description of the Related Art

Recently, presentations in a conference, workshop, and the like often use a projector which projects an image signal received from a personal computer (to be referred to as PC) on the screen.

In general, a PC and projector send/receive image signals via an analog connection using an analog RGB cable. However, the analog connection is cumbersome, a connection from a remote place is difficult, and there is a need to simultaneously connect a plurality of PCs. For these reasons, an image display system which connects a PC and projector via a communication line is receiving attention.

Conventionally, to implement an image display system, a screen displayed on the monitor of an information processing apparatus such as a PC is periodically captured, and the captured image data is sent to a display apparatus such as a projector.

Note that screen capturing is for obtaining, by a driver from a video memory, screen data displayed on the monitor of a PC or the like, and temporarily storing it in an internal RAM.

When a projector is connected to a plurality of PCs via a communication line, one projector can display the screens of these PCs side by side (to be referred to as multi-screen display). Similarly, one projector can display a plurality of screen data such as the primary and secondary screens of one PC by multi-screen display.

For example, Japanese Patent Laid-Open No. 2004-054134 discloses a technique capable of multi-screen display to display the display screens of a plurality of communicably connected terminal devices on one screen of a display apparatus. A communication unit receives captured image data sent from each terminal device having the screen capturing function. An image composition unit composites the respective captured image data into image data of one screen by screen division. A display control unit implements multi-screen display.

However, in Japanese Patent Laid-Open No. 2004-054134, multi-screen display is done in the same way regardless of the monitor screens of different PCs which display images irrelevant to each other on their monitors, or a plurality of monitor screens of one PC. In display of respective screens close to each other, visibility becomes poor when different monitor screens irrelevant to each other are seen. If respective screens are displayed apart from each other, a plurality of relevant monitor screens for one PC are hardly recognized as one original continuous image, degrading visibility.

SUMMARY OF THE INVENTION

The present invention has been made in consideration of the aforementioned problems, and realizes a display control technique capable of improving visibility by changing the display form in accordance with the relevance between images when displaying a plurality of images on a display apparatus such as a projector.

In order to solve the aforementioned problems, the present invention provides a display apparatus which displays image data sent from a plurality of information processing apparatuses via a communication line, comprising: a communication unit configured to communicate with the information processing apparatus via the communication line; a determination unit configured to determine which of (1) image data sent from the same information processing apparatus and (2) image data sent from different information processing apparatuses are a plurality of image data received by the communication unit; a layout change unit configured to set a first layout for the plurality of image data when the determination unit determines that (1) the plurality of image data are data received from the same information processing apparatus, and set a second layout different from the first layout for the plurality of image data when the determination unit determines that (2) the plurality of image data are data received from a plurality of information processing apparatuses; and a display control unit configured to display the plurality of image data on a screen in a layout changed by the layout change unit.

In order to solve the aforementioned problems, the present invention provides an information processing apparatus including a monitor for displaying an image, comprising: a communication unit configured to communicate with a display apparatus connected via a communication line; an image capturing unit configured to capture respective image data displayed on a plurality of monitors; a determination unit configured to determine a display apparatus as a sending destination of each image data captured by the image capturing unit; and an image processing unit configured to combine a plurality of image data having the same sending destination, wherein the communication unit sends, to the display apparatus determined as the sending destination by the determination unit, one of each image data captured by the image capturing unit and image data combined by the image processing unit.

In order to solve the aforementioned problems, the present invention provides an image display system comprising at least one information processing apparatus and a display apparatus which are connected via a communication line, the information processing apparatus including: a communication unit configured to communicate with the display apparatus connected via the communication line; an image capturing unit configured to capture respective image data displayed on a plurality of monitors; a determination unit configured to determine a display apparatus as a sending destination of each image data captured by the image capturing unit; and a layout setting unit configured to determine a layout for each image data in each display apparatus serving as the sending destination, wherein the communication unit sends, to the display apparatus determined as the sending destination by the determination unit, one of each image data captured by the image capturing unit and layout setting information set by the layout setting unit, and the display apparatus including: a communication unit configured to communicate with the information processing apparatus via the communication line; a determination unit configured to determine which of image data sent from the same information processing apparatus and image data sent from a plurality of information processing apparatuses are a plurality of image data received by the communication unit; a layout change unit configured to set a first layout for the plurality of image data regardless of the layout setting information when the determination unit determines that the plurality of image data are data received from the same information processing apparatus, and set a second layout different from the first layout for the plurality of image data when the determination unit determines that the plurality of image data are data received from a plurality of information processing apparatuses; and a display control unit configured to display the plurality of image data on a screen in a layout changed by the layout change unit.

In order to solve the aforementioned problems, the present invention provides a method of controlling a display apparatus which displays image data sent from a plurality of information processing apparatuses via a communication line, the method comprising the steps of: communicating with the information processing apparatus via the communication line; determining which of (1) image data sent from the same information processing apparatus and (2) image data sent from different information processing apparatuses are a plurality of image data received via the communication line; setting a first layout for the plurality of image data when (1) the plurality of image data are determined to be data received from the same information processing apparatus, and set a second layout different from the first layout for the plurality of image data when (2) the plurality of image data are determined to be data received from a plurality of information processing apparatuses; and displaying the plurality of image data on a screen in the determined layout.

In order to solve the aforementioned problems, the present invention provides a method of controlling an information processing apparatus having a plurality of monitors for displaying an image, the method comprising the steps of: communicating with a display apparatus connected via a communication line; capturing respective image data displayed on the plurality of monitors; determining a display apparatus as a sending destination of each captured image data; combining a plurality of image data having the same display apparatus as the sending destination; and sending one of each captured image data and combined image data to the display apparatus determined as the sending destination.

According to the present invention, visibility can be improved by changing the display form in accordance with the relevance between images when displaying a plurality of images on a display apparatus such as a projector.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 3A and 3B are flowcharts showing processing on the PC side in the image display system according to the first embodiment;

FIGS. 4A to 4C are flowcharts showing processing on the projector side in the image display system according to the first embodiment;

DESCRIPTION OF THE EMBODIMENTS

Various exemplary embodiments, features, and aspects of the invention will be described in detail below with reference to the drawings.

First Embodiment

The arrangement of an image display system according to the first embodiment of the present invention will be described with reference to FIG. 1.

Figure 1:
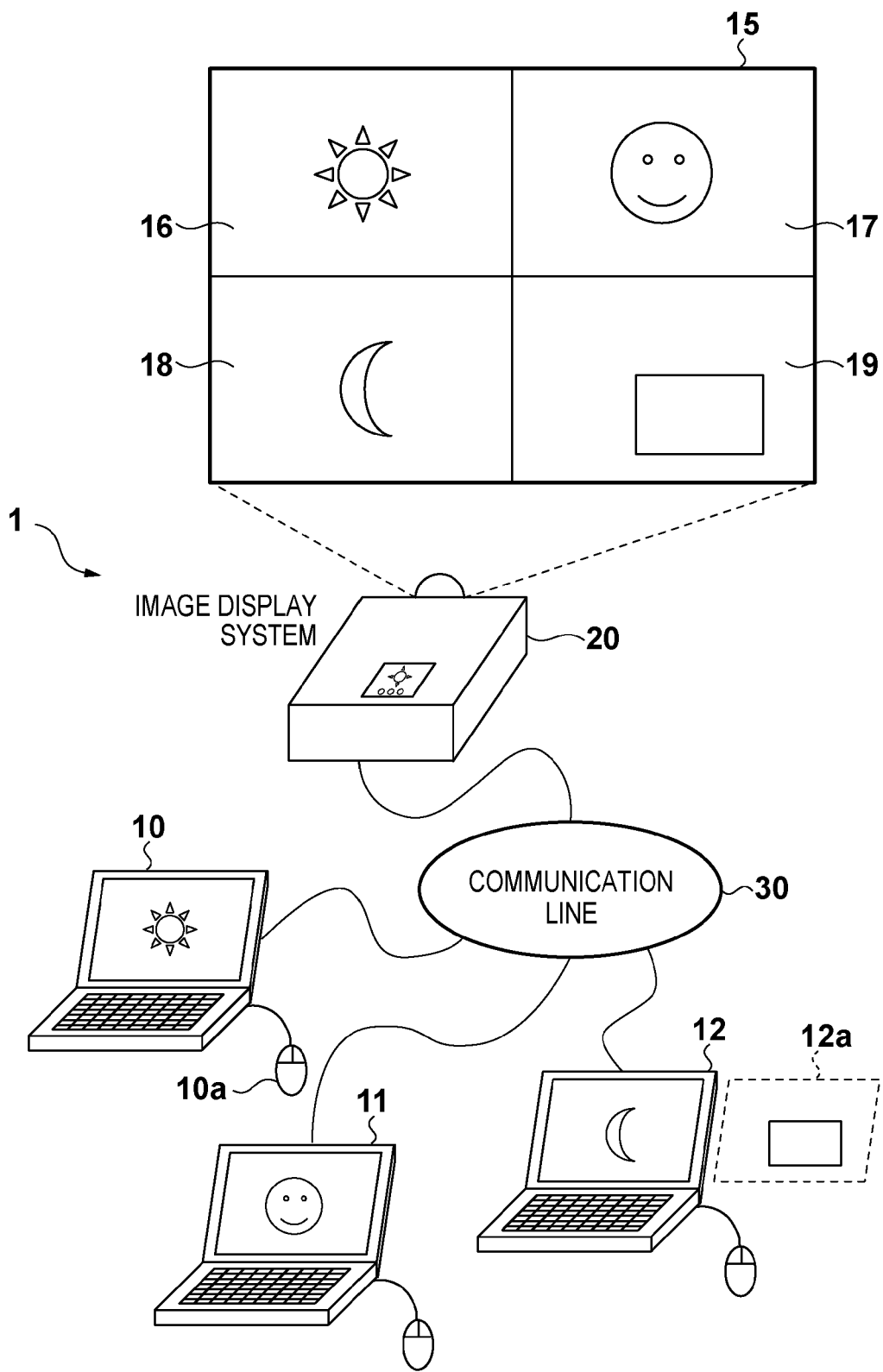
FIG. 1 is a view showing the arrangement of an image display system according to an embodiment of the present invention.

Referring to FIG. 1, an image display system 1 includes a PC 10 exemplified as an information processing apparatus according to the present invention, and a projector 20 exemplified as a display apparatus. The PC 10 and projector 20 are communicably connected via a communication line 30 such as a LAN.

The PC 10 captures image data displayed on the monitor, and sends it to the projector 20 via the communication line 30. The projector 20 receives the image data from the PC 10, converts it into a format capable of projecting it on the screen of the projector 20, and displays the converted image data. At this time, a pointer on a window system in the PC 10 is operated with an operation unit 10a such as a mouse. Pointer display position data is sent to the projector 20 independently of the image data. Note that the window system is, for example, a graphical user interface (GUI) implemented by Windows® which is an operating system (to be referred to as OS) available from Microsoft. The GUI can assign unique areas to a plurality of tasks and multiplex screen outputs.

In the image display system 1, a plurality of PCs 11 and 12 having the same function as that of the PC 10 are connected to the PC 10 via the communication line 30.

When projecting image data received from the PC 10 on a projection screen 15, the projector 20 displays screen data of the PC 10 in a projection area 16, that of the PC 11 in a projection area 17, and that of the PC 12 in a projection area 18, respectively. Screen data of a secondary monitor 12a of the PC 12 is displayed in a projection area 19 for which no screen data is received from another PC via the communication line 30.

FIG. 1 shows only the projector 20. However, a plurality of projectors equivalent to the projector 20 are connectable to the communication line 30. The PC 10 can properly select a destination projector for projecting screen data.

<Block Arrangements of PC and Projector>

The block arrangements of the PCs 10 to 12 and projector 20 will be described with reference to FIG. 2.

Figure 2:
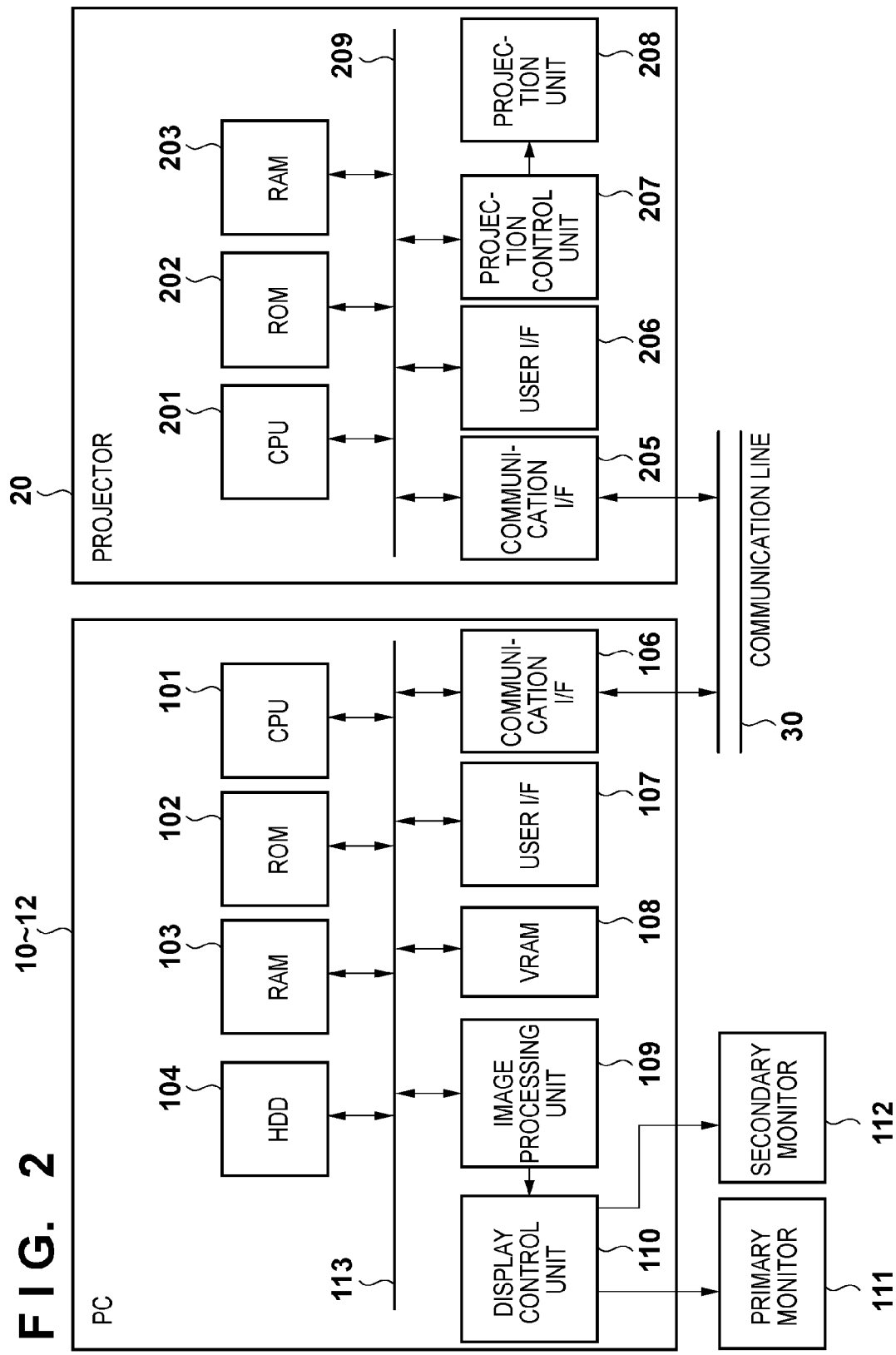
FIG. 2 is a block diagram showing the image display system according to the embodiment.

Referring to FIG. 2, each of the PCs 10 to 12 includes a CPU 101, a ROM 102 which stores control programs describing processing procedures for the CPU 101, and a RAM 103 serving as a work memory for temporarily storing control programs and data. Also, each of the PCs 10 to 12 includes a hard disk drive (HDD) 104 for storing programs such as an application and OS, and data. Further, each of the PCs 10 to 12 includes a communication I/F (interface) 106 for communicating with the projector 20, another projector, server, and the like via the communication line 30. The each of the PCs 10 to 12 includes a user I/F 107 for accepting a user operation input via a keyboard or pointing device (for example, mouse).

In addition, each of the PCs 10 to 12 includes a VRAM 108 which stores image data to be displayed on the monitor screen of each of the PCs 10 to 12, an image processing unit 109, a display control unit 110, monitors 111 and 112 each formed from a display device such as a liquid crystal panel, and an internal bus 113 which connects these elements. When a plurality of monitors 111 and 112 are connected to the image processing unit 109, a signal of image data to be displayed is processed for each monitor, generating a display signal. Note that the number of monitors is not limited to two, and may be three or more.

The projector 20 includes a CPU 201, a ROM 202 which stores control programs describing processing procedures for the CPU 201, and a RAM 203 serving as a work memory for temporarily storing control programs and data. Also, the projector 20 includes a communication I/F 205 for communicably connecting the projector 20 to the PCs 10 and 12, and a user I/F 206 for accepting a user operation input via various operation buttons, an operation remote control, and the like. Further, the projector 20 includes a projection control unit 207 for outputting image data to a projection unit 208, the projection unit 208 formed from a liquid crystal panel, a driving unit for it, a lens, a driving system for it, and a light source, and an internal bus 209 which connects these elements. Note that another projector also has the same arrangement.

<Processing on PC Side>

Processing by the PCs 10 to 12 will be explained with reference to FIGS. 3A and 3B. Note that processes shown in FIGS. 3A and 3B are executed by expanding, by the CPU 101 in the RAM 103, an application program stored in the HDD 104 when a projector control application starts in each of the PCs 10 to 12.

Referring to FIG. 3A, the CPU 101 determines whether a corresponding one of the PCs 10 to 12 is set to the multi-screen display mode (step S101). The multi-screen display mode is, for example, a mode in which a plurality of monitors 111 and 112 are connected to each of the PCs 10 to 12 and an image set for each monitor is displayed, or a mode in which an image displayed on the monitor of each of the PCs 10 to 12 is separated into a plurality of images to display them. For example, the layout setting of screens on a plurality of monitors can be displayed by obtaining display setting information in screen property settings in the Windows OS in each of the PCs 10 to 12.

A layout setting in the multi-screen display mode will be explained with reference to FIGS. 5A to 5E by exemplifying a case in which the primary monitor 111 and secondary monitor 112 connected to the PC 10 display images, respectively.

Figure 5A:
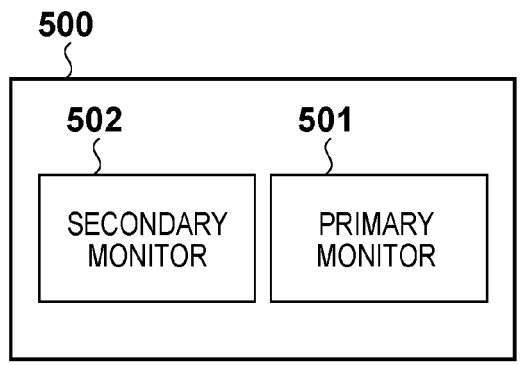
FIGS. 5A to 5E are views each exemplifying a layout setting screen on the PC side in the image display system according to the embodiment.

FIG. 5A exemplifies a layout setting when two monitor screens of the same size are displayed from side to side. A primary monitor 501 and secondary monitor 502 are displayed from side to side in a layout setting screen 500 displayed on the PC 10.

Figure 5B:
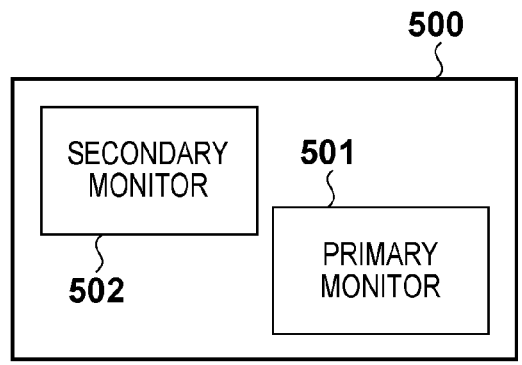

FIG. 5B exemplifies a layout setting when two monitor screens of the same size are vertically shifted and displayed from side to side. In FIG. 5B, the primary monitor 501 and secondary monitor 502 are displayed from side to side at different Y-coordinates in the vertical direction in the layout setting screen 500 displayed on the PC 10.

Figure 5C:
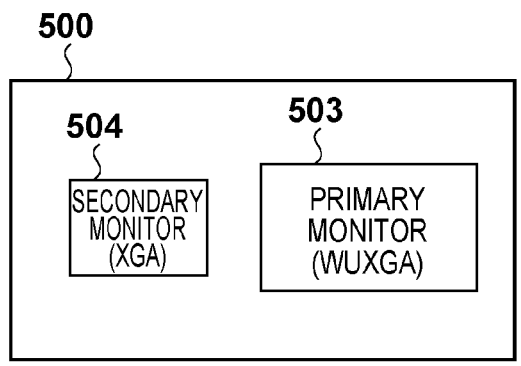

FIG. 5C exemplifies a layout setting when two monitor screens of different sizes are displayed from side to side. A primary monitor 503 and secondary monitor 504 of different sizes are displayed from side to side in the layout setting screen 500.

Figure 5D:
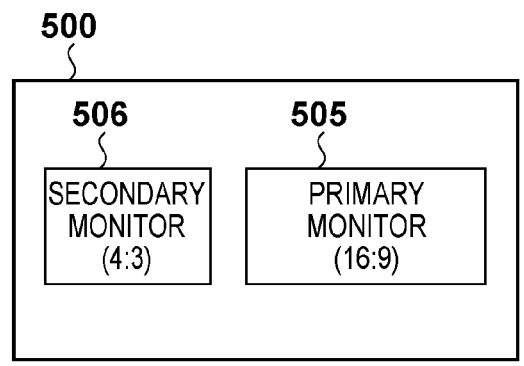

FIG. 5D exemplifies a layout setting when two monitor screens of different aspect ratios are displayed from side to side. A primary monitor 505 and secondary monitor 506 of different aspect ratios are displayed from side to side in the layout setting screen 500.

Figure 5E:
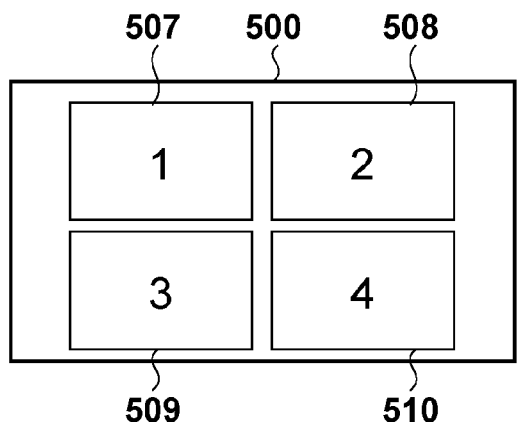

FIG. 5E exemplifies a layout setting when four monitor screens of the same size are displayed in a matrix. A first monitor 507, second monitor 508, third monitor 509, and fourth monitor 510 of the same aspect ratio are displayed in a matrix in the layout setting screen 500.

In addition to the layout settings exemplified in FIGS. 5A to 5E, various layouts are available.

Referring back to FIG. 3A, if the CPU 101 determines in step S101 that the multi-screen display mode is set, it obtains layout setting information of a corresponding one of the PCs 10 to 12 (step S102).

The CPU 101 determines whether there are a plurality of screen data which are set in a layout setting screen as shown in FIGS. 5A to 5E and are to be sent to the projector 20 (to be referred to as sending image data) (step S103). The user operates an application screen displayed on the monitor of each of the PCs 10 to 12 to set sending image data.

If the CPU 101 determines in step S103 that there are a plurality of sending image data, it determines the sending destination of each image data in accordance with a user operation input via the user I/F 107 (step S104).

In step S105, the CPU 101 issues a connection request via the communication I/F 106 to establish a communication connection with the destination projector of the sending image data. The issued connection request is sent together with unique packet information added on a communication protocol such as TCP/IP.

If it is determined in step S101 that the single-screen display mode is set or it is determined in step S103 that a plurality of sending image data to the projector does not exist, the process shifts to step S105. In the single-screen display mode, for example, the secondary monitor 112 of the PC 10 is not connected, and only screen data of the primary monitor 111 of the PC 10 is displayed.

In step S106, the CPU 101 receives a reply to the connection request from the projector at the connection request destination. If a connection is possible, the CPU 101 establishes a connection and the process shifts to step S107. If a connection is not possible, the process ends.

In step S107, the CPU 101 sends, to the destination projector via the communication I/F 106, layout setting information as shown in FIGS. 5A to 5E and image information which are set in each PC, in order to set the screen layout of the projection unit 208 of the destination projector (step S107). The image information includes the number of images, the resolution and aspect ratio (screen size) of each image, whether a layout in which images come close to each other is set, the display area of each image in the screen layout, whether images are similar or different, and the correlation between images.

Processing of sending image data displayed on the monitor screen of the PC 10 to the projector 20 via the communication line 30 will be described with reference to FIG. 3B.

In FIG. 3B, the CPU 101 designates the coordinates of an image output to the monitor by the display control unit 110, and captures image data from the VRAM 108 which stores the image (step S111). When a plurality of monitors display images, the coordinates of each sending image data determined in step S104 are designated out of image data displayed on the respective monitors, and the image data is captured from the VRAM 108 (image capturing processing).

In step S111, each captured sending image data is sent to the destination projector via the communication I/F 106 (step S112). When there are a plurality of sending image data, target image data is sent to each destination projector set in step S104 of FIG. 3A (step S112). Note that a plurality of image data can also be sent to the same projector.

If a program end instruction is input via the user I/F 107 upon completion of sending the respective image data, the CPU 101 ends the process; if a program end instruction is not input, shifts to step S114 (step S113).

In step S114, the CPU 101 waits for updating image data output from the display control unit 110. If the image data is updated, the CPU 101 returns to step S111 to capture, from the VRAM 108, image data output to the monitor.

By the above processing, image data displayed on a plurality of monitors by each of the PCs 10 to 12 can be sent to a destination projector via the communication line 30.

<Processing on Projector Side>

Processing by the projector 20 will be explained with reference to FIGS. 4A to 4C. Note that processes shown in FIGS. 4A to 4C are executed by expanding, by the CPU 201 in the RAM 203, a firmware program stored in the ROM 202 when the projector 20 is turned on.

Figure 4A:
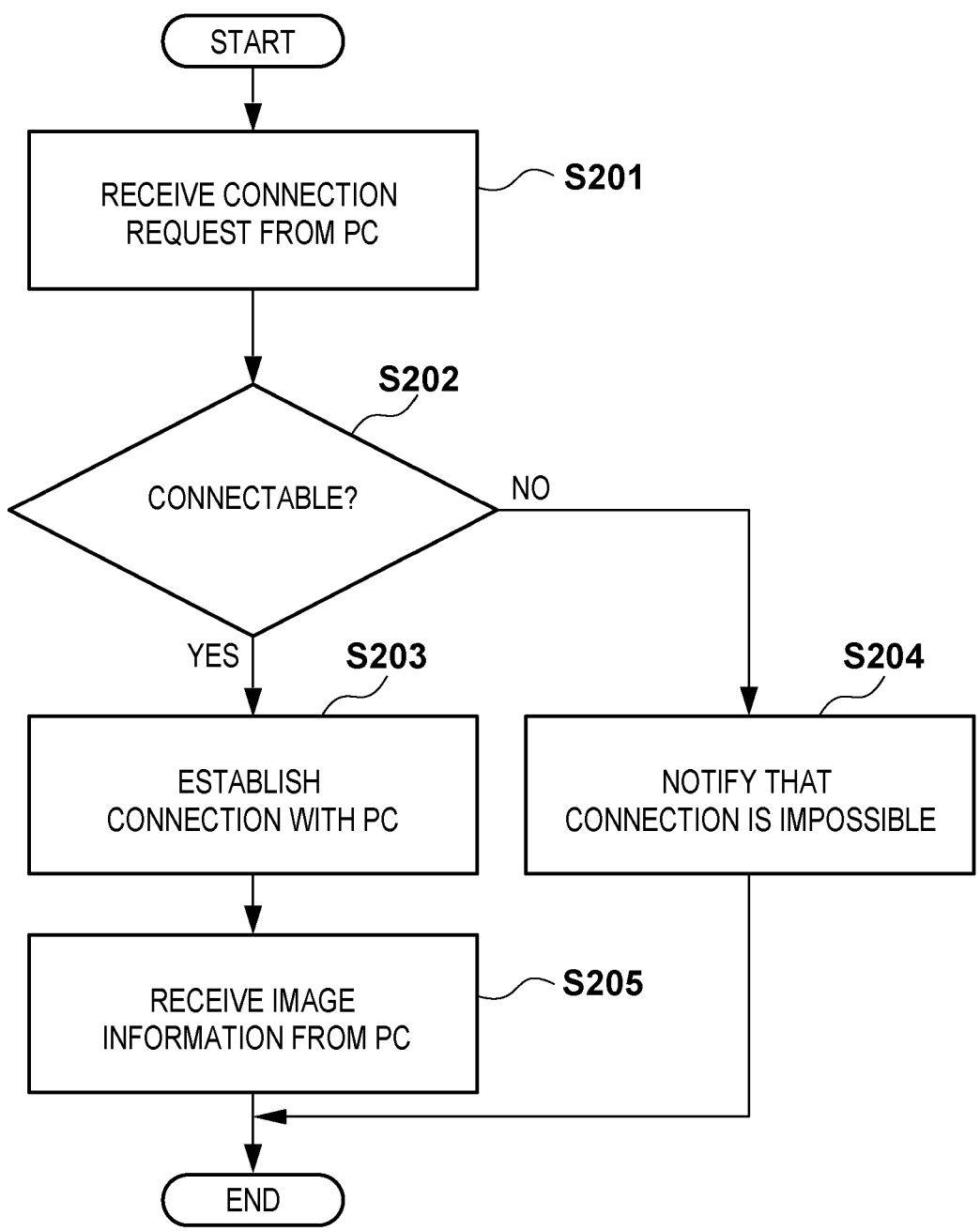
Figure 4C:
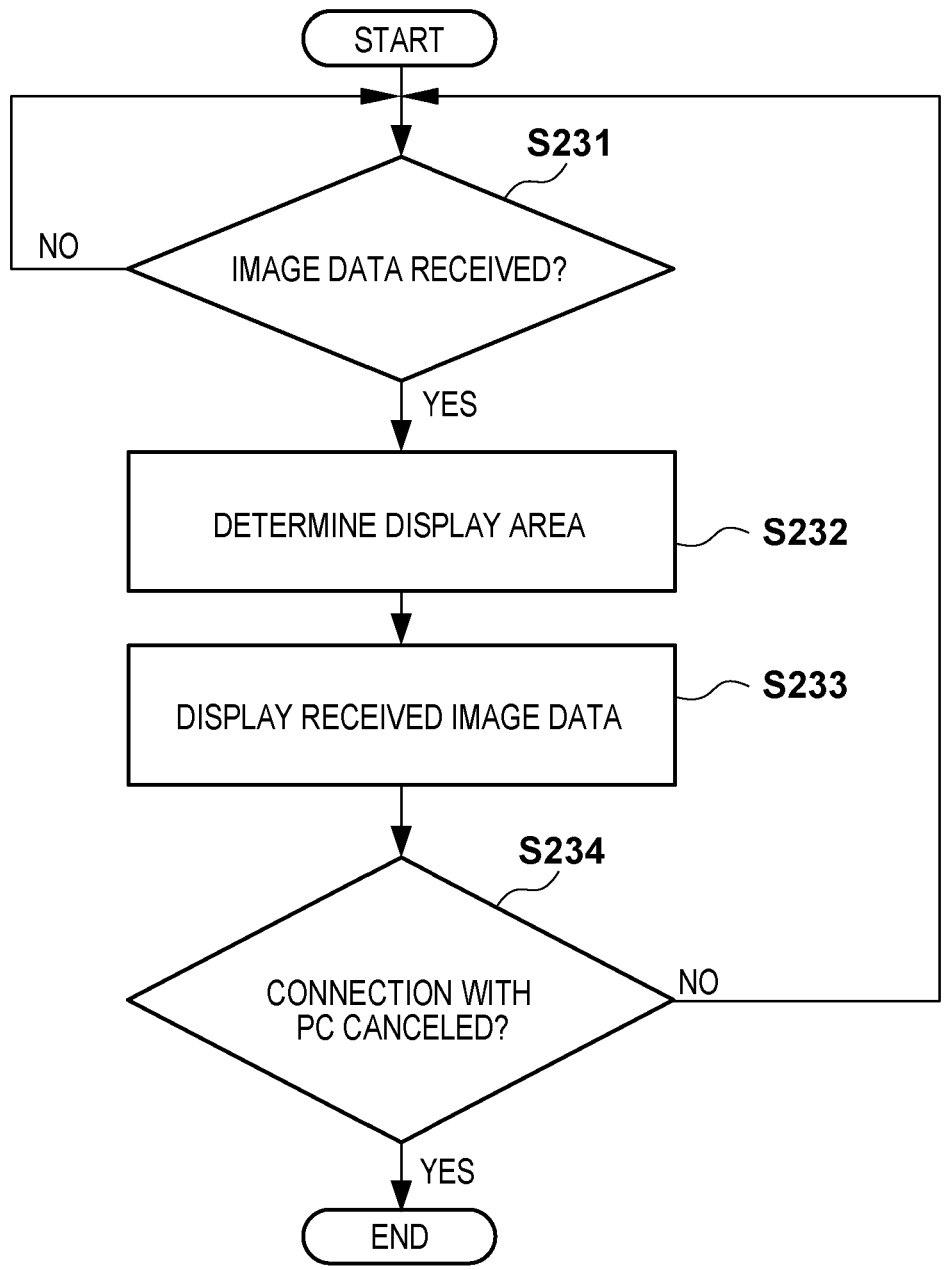

Referring to FIG. 4A, the CPU 201 receives a connection request via the communication I/F 205 from one of the PCs 10 to 12 connected to the communication line 30 (step S201). After receiving the connection request, the CPU 201 determines whether a connection is possible (step S202).

If the CPU 201 determines in step S202 that a connection is possible, it notifies the connection request-sending PC via the communication I/F 205 that the connection request has been accepted (step S203). If a connection is not possible, the CPU 201 notifies the connection request-sending PC via the communication I/F 205 that the connection is rejected, and then ends the process (step S204).

The CPU 201 receives layout setting information and image information of the projector 20 via the communication I/F 205 from the PC (PC 10 in this case) with which a connection has been established in step S203 (step S205).

FIG. 4B shows processing when the projector 20 determines a layout for displaying a plurality of image data received from the PC 10.

Referring to FIG. 4B, the CPU 201 determines whether a change permission setting is made so that an existing layout setting made in advance by the user in the projector 20 can be automatically changed to a layout received from the PC 10 (step S211). If a change permission setting is made, the process shifts to step S212. If a change inhibition setting is made, the CPU 201 projects image data received from the PC 10 in accordance with a screen layout set in the projector 20 in FIG. 4C.

In step S212, the CPU 201 determines whether to receive a plurality of image data from the PC 10 which is the connection-established device. In this case, the determination is made from the image information received in step S205. If the CPU 201 determines in step S212 to receive a plurality of image data, the process shifts to step S213; if NO, to step S220.

In step S213, the CPU 201 determines whether a plurality of image data to be received have a screen layout in which they come close to each other at a predetermined interval, like FIGS. 5A and 5E (layout determination processing). If the CPU 201 determines in step S213 that a plurality of image data do not come close to each other, the process shifts to step S220; if YES, to step S214.

In step S214, the CPU 201 determines whether a plurality of image data to be received are different (image determination processing). If a plurality of image data to be received are identical, the process ends and shifts to image display processing in FIG. 4C. If a plurality of image data to be received are different, the process shifts to step S215.

In step S215, the CPU 201 determines whether a plurality of image data have the same resolution (size determination processing and resolution determination processing). If a plurality of image data have the same resolution, the process shifts to step S216; if NO, to step S217.

In step S216, the CPU 201 determines whether a plurality of image data have the same screen aspect ratio (size determination processing and aspect ratio determination processing). If a plurality of image data have the same aspect ratio, the process shifts to step S219; if NO, to step S217.

In step S217, the CPU 201 determines whether an existing setting made in advance by the user in the projector 20 is a setting of displaying respective images at the same size and same aspect ratio in multi-screen display. If the existing setting is a setting of displaying respective images at the same size and same aspect ratio, the process shifts to step S218; if NO, to step S220.

In step S218, the CPU 201 resizes the resolutions and/or aspect ratios of a plurality of image data to the resolution and/or aspect ratio of typical image data selected from the plurality of image data in the letter box format. Resize processing may comply with a value set in advance by the user, or a predetermined rule such as adjustment to the highest resolution and an aspect ratio of 4:3.

In step S219, the CPU 201 reads out, from the RAM 203, screen layout information set in advance by the user and changes it to a screen layout (first layout) which combines a plurality of image data.

In step S220, the CPU 201 reads out, from the RAM 203, screen layout information set in advance by the user and changes it to a screen layout (second layout) which identifiably separates a plurality of image data.

When changing the layout setting in steps S219 and S220, a screen may be displayed to inquire from the sending PC (user) whether to change the layout, and after confirmation by the user, the layout may be changed. As a result of comparison, the display layout in step S219 and that in step S220 are different in the layout positions of a plurality of image data. In the display layout in step S219, the layout positions of a plurality of image data are closer to each other than in the display layout in step S220. In the display layout in step S220, an image such as a frame is displayed to separate a plurality of image data from each other. In the display layout in step S219, no image such as a frame is displayed.

Examples of layout change processing in steps S219 and S220 will be explained with reference to FIGS. 6A to 6D.

Figure 6A:
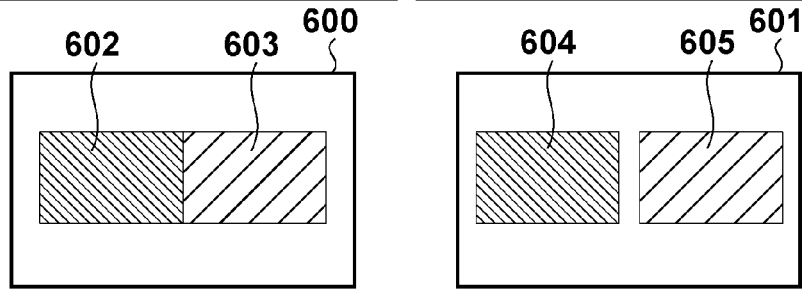
FIGS. 6A to 6D are views each exemplifying a screen layout changeable on the projector side in the image display system according to the embodiment.

FIG. 6A exemplifies a screen layout when the distance between a plurality of image data is changed. In step S219, an image 602 of the primary monitor 111 (or the PC 11) and an image 603 of the secondary monitor 112 (or the PC 12) are combined and displayed from side to side on a projection screen 600. In step S220, an image 604 of the primary monitor 111 (or the PC 11) and an image 605 of the secondary monitor 112 (or the PC 12) are identifiably separated and displayed on a projection screen 601. In the embodiment, the display layout in step S219 combines and displays the projection images 602 and 603. However, the display layout in step S219 suffices to lay out projection images at closer positions than in the display layout corresponding to step S220 even if the projection images are not combined. For example, when projection images are displayed apart from each other at a horizontal interval of 10 pixels in step S220, they are spaced apart by less than 10 pixels in step S219. That is, the projection images are spaced apart by 0 to nine pixels in step S219. In the display layout in step S219, the layout positions of a plurality of image data are closer to each other than in the display layout in step S220.

Figure 6B:
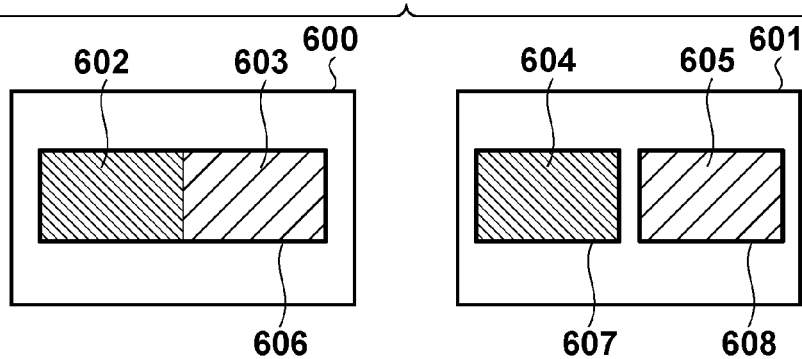

FIG. 6B exemplifies a screen layout when a frame is displayed around each image. In step S219, the image 602 of the primary monitor 111 (or the PC 11) and the image 603 of the secondary monitor 112 (or the PC 12) are combined from side to side and displayed on the projection screen 600 while a frame 606 surrounds the entire outer edge of the images 602 and 603. In step S220, the respective images are identifiably separated on the projection screen 601 by surrounding the outer edge of the image 604 of the primary monitor 111 (or the PC 11) by a frame 607 and the outer edge of the image 605 of the secondary monitor 112 (or the PC 12) by a frame 608 (frame display processing).

Figure 6C:
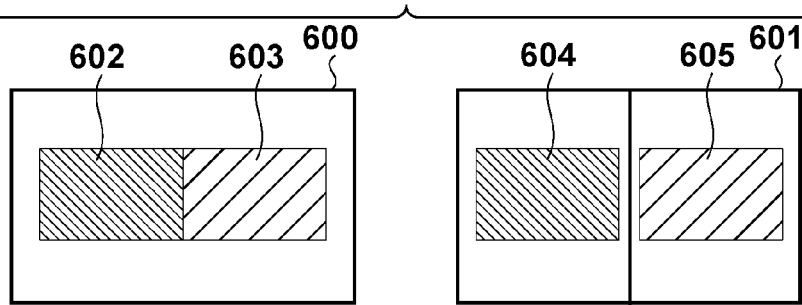

FIG. 6C exemplifies a screen layout when the distance between a plurality of images is changed. In step S219, the image 602 of the primary monitor 111 (or the PC 11) and the image 603 of the secondary monitor 112 (or the PC 12) are combined and displayed from side to side on the projection screen 600. In step S220, the respective images are identifiably separated on the projection screen 601 by partitioning the image 604 of the primary monitor 111 (or the PC 11) and the image 605 of the secondary monitor 112 (or the PC 12) by a partition line 609 (line display processing).

Figure 6D:
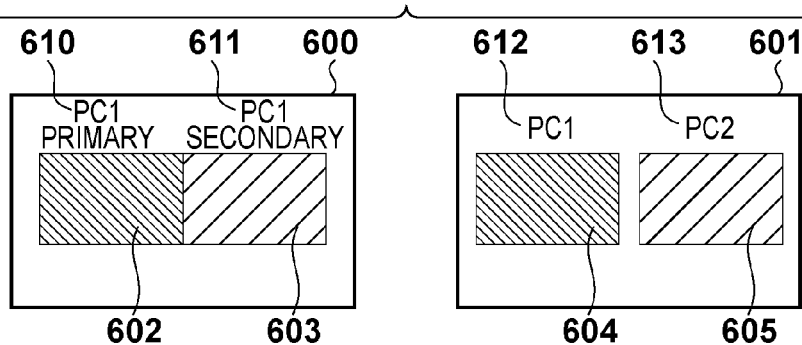

FIG. 6D exemplifies a screen layout when the distance between a plurality of images is greatly changed. In step S219, the image 602 of the primary monitor 111 and the image 603 of the secondary monitor 112 are combined and displayed from side to side on the projection screen 600. At the same time, a name 610 of the primary monitor 111 which displays the image 602 is displayed adjacent to the image 602, and a name 611 of the secondary monitor 112 which displays the image 603 is displayed adjacent to the image 603 (identification information display processing).

In step S220, the image 604 of the PC 11 and the image 605 of the PC 12 are combined on the projection screen 601. Identification information 612 of the PC 11 serving as the sending source of the image 604 is displayed adjacent to the image 604, and identification information 613 of the PC 12 serving as the sending source of the image 605 is displayed adjacent to the image 605 (identification information display processing).

FIG. 4C shows processing when the projector receives image data from the PC and displays it.

Referring to FIG. 4C, after a connection with a PC is established, the program starts and waits for reception of image data sent from the PC present on the communication line 30 via the communication I/F 205 (step S231).

In step S232, the CPU 201 determines the display area of received image data on the projection screen in accordance with layout setting information received from the PC or the screen layout set in step S219 or S220.

In step S233, the CPU 201 projects image data to the projection unit 208 via the projection control unit 207 for each determined display area.

In step S234, the CPU 201 determines whether the connection with the PC has been canceled. If the connection has been canceled, the process ends; if NO, returns to step S231 to wait for reception of an image.

According to the above processing, in multi-screen display of a plurality of image data sent from the same PC on the projector, the display form is changed depending on the relevance between the image data. For example, images which come close to each other at a predetermined interval on the PC side are combined and displayed from side to side. Other images are identifiably separated and displayed. This improves image visibility.

Second Embodiment

As the second embodiment, processing of combining a plurality of sending image data on the PC side and sending them will be described. Note that the block arrangement of an image display system which implements the second embodiment is the same as that in the above-described first embodiment, and a description thereof will not be repeated.

In the first embodiment, the projector changes the layout of image data received from the PC. In the second embodiment, the PC changes the screen layout on the projector.

Processing by PCs 10 to 12 in the second embodiment will be explained with reference to FIG. 7. In this processing, processing of establishing a communication connection with the projector is the same as that described with reference to FIG. 3A. Note that processing shown in FIG. 7 is executed by expanding, by a CPU 101 in a RAM 103, an application program stored in an HDD 104 when a projector control application starts in each of the PCs 10 to 12.

Figure 7:
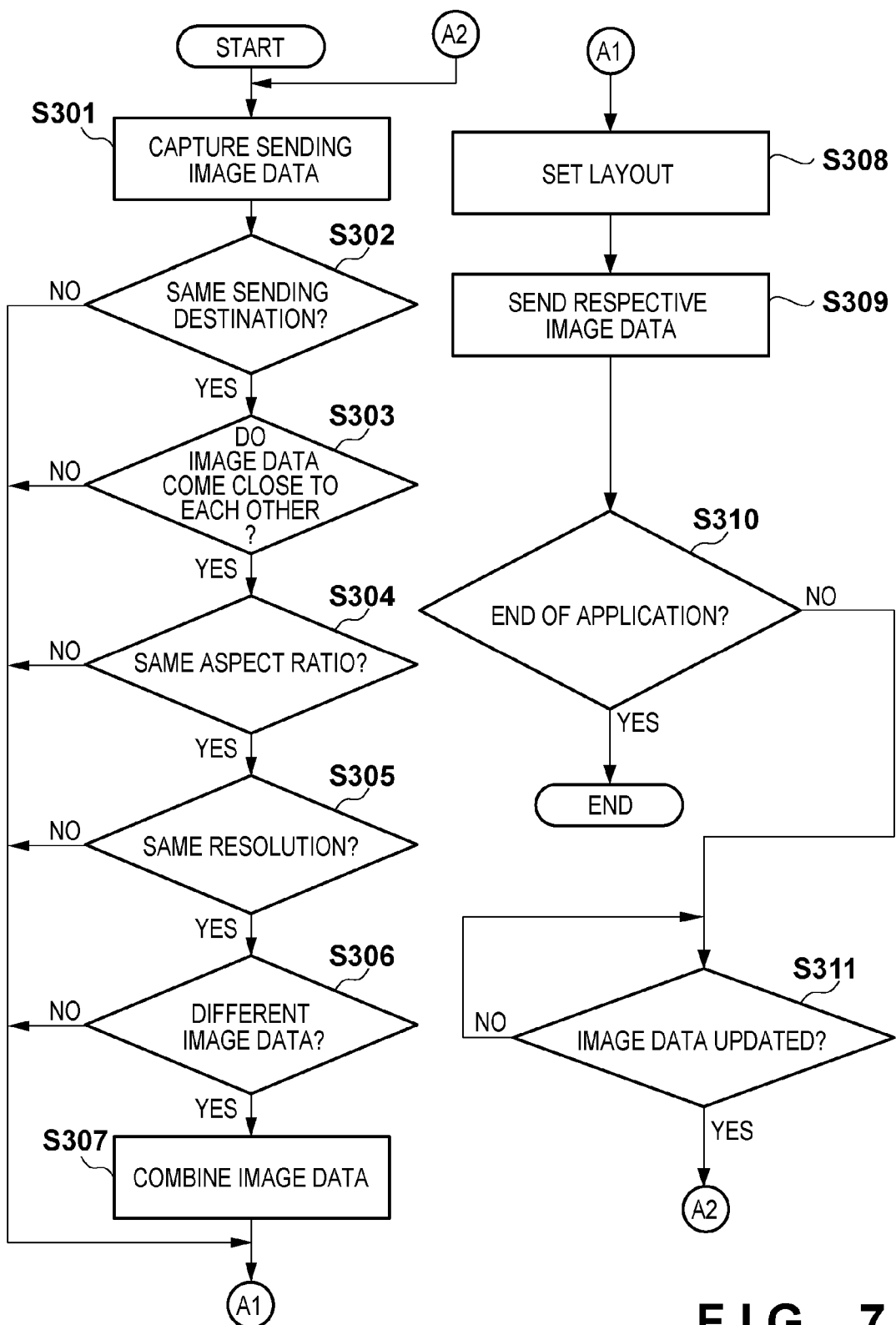
FIG. 7 is a flowchart showing processing on the PC side in an image display system according to the second embodiment.

Referring to FIG. 7, the CPU 101 captures, from a VRAM 108, image data which are displayed on a plurality of monitors 111 and 112 by an image processing unit 109 via a display control unit 110 (step S301).

In step S302, the CPU 101 determines whether the sending destinations of a plurality of image data are the same projector. If the sending destinations are the same projector, the process shifts to step S302; if NO, to step S308.

In step S303, the CPU 101 determines whether a plurality of image data to be sent have a screen layout in which they come close to each other at a predetermined interval, like FIGS. 5A and 5E. If the CPU 101 determined in step S303 that a plurality of image data come close to each other, the process shifts to step S304; if NO, to step S308. In the second embodiment, for an image layout in which a plurality of image data come close to each other at a predetermined interval, like FIGS. 5A and 5E, a plurality of images are combined into one image when capturing image data.

In step S304, the CPU 101 determines whether a plurality of image data to be sent have the same screen aspect ratio (step S304). If a plurality of image data to be sent have the same aspect ratio, the process shifts to step S305; if NO, to step S308.

In step S305, the CPU 101 determines whether a plurality of image data to be sent have the same resolution. If a plurality of image data to be sent have the same resolution, the process shifts to step S306; if NO, to step S308.

In step S306, the CPU 101 determines whether a plurality of image data to be sent are different. If a plurality of image data to be sent are different, the process shifts to step S307. If a plurality of image data to be sent are identical, the process shifts to step S308.

In step S307, the CPU 101 combines image data which come close to each other at a predetermined interval. More specifically, in step S307, the CPU 101 captures an image while a plurality of image data which come close to each other at a predetermined interval are combined into one image data.

In step S308, the CPU 101 sets the screen layout of a destination projector. In this case, the CPU 101 sends, to the destination projector, layout setting information for setting a layout capable of displaying the image data combined in step S307.

In step S309, the CPU 101 sends the respective target image data to the destination projector.

If a program end instruction is input via a user I/F 107 upon completion of sending the respective image data, the CPU 101 ends the process; if a program end instruction is not input, shifts to step S311 (step S310).

In step S311, the CPU 101 waits for updating of image data output from the display control unit 110. If the image data is updated, the CPU 101 returns to step S301 to capture, from the VRAM 108, image data output to the monitors 111 and 112.

Image display processing in a projector 20 is the same as those in FIGS. 4A and 4C except for processing in FIG. 4B.

Third Embodiment

As the third embodiment, processing of capturing all image data displayed on all monitors on the PC side, separating the captured image data for each monitor or combining them for each sending destination, and sending them will be described. Note that the block arrangement of an image display system which implements the third embodiment is the same as that in the above-described first embodiment, and a description thereof will not be repeated. Two monitors 111 and 112 are connected to a PC 10 in the third embodiment, but three or more monitors may be connected.

Processing by the PC in the third embodiment will be explained with reference to FIG. 8. In this processing, processing of establishing a communication connection with the projector is the same as that described with reference to FIG. 3A. Processing shown in FIG. 8 is executed by expanding, by a CPU 101 in a RAM 103, an application program stored in an HDD 104 when a projector control application starts in the PC 10.

Figure 8:
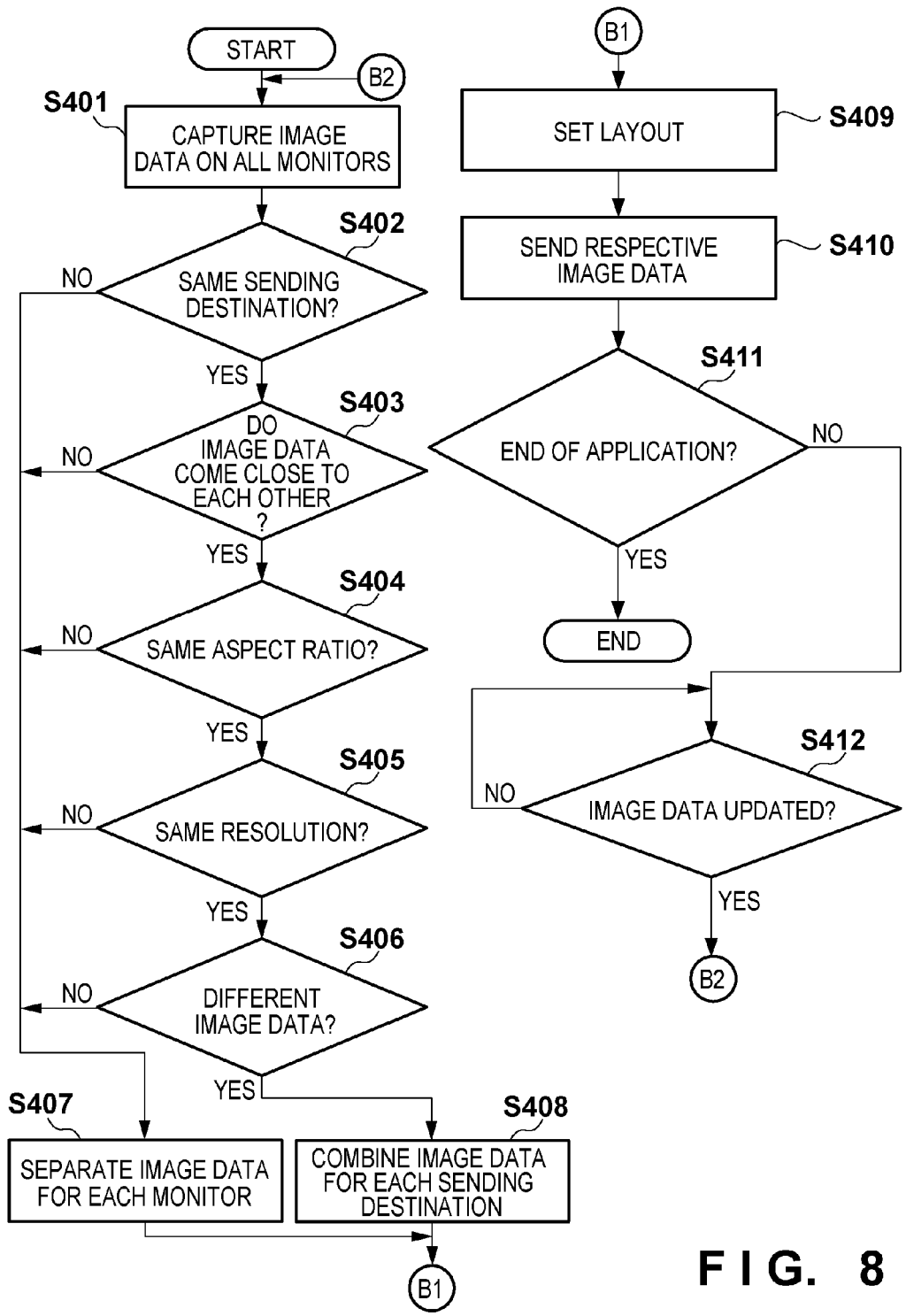
FIG. 8 is a flowchart showing processing on the PC side in an image display system according to the third embodiment.

Referring to FIG. 8, the CPU 101 captures, from a VRAM 108, all image data which are displayed on all the monitors of the PC 10 by an image processing unit 109 via a display control unit 110 (step S401).

In step S402, the CPU 101 determines whether there are a plurality of image data having the same sending destination out of all the image data captured in step S401. If there are a plurality of image data having the same sending destination, the process shifts to step S403. If the image data have different sending destinations or only single image data has the same sending destination, the process shifts to step S407.

In step S403, the CPU 101 determines whether a plurality of image data having the same sending destination have a screen layout in which they come close to each other at a predetermined interval, like FIGS. 5A and 5E. If a plurality of image data come close to each other, the process shifts to step S404; if NO, to step S407.

In step S404, the CPU 101 determines whether a plurality of image data having the same sending destination and the screen layout in which they come close to each other have the same screen aspect ratio. If a plurality of image data have the same aspect ratio, the process shifts to step S405; if NO, to step S407.

In step S405, the CPU 101 determines whether a plurality of image data having the same sending destination and the screen layout in which they come close to each other have the same resolution. If a plurality of image data have the same resolution, the process shifts to step S406; if NO, to step S407.

In step S406, the CPU 101 determines whether a plurality of image data having the same sending destination and the screen layout in which they come close to each other are different. If a plurality of image data are identical, the process shifts to step S407. If a plurality of image data are different, the process shifts to step S408.

In step S407, the CPU 101 generates one image in which image data are identifiably separated for respective monitors, and stores it in the RAM 103. The process then shifts to step S409.

In step S408, the CPU 101 generates one image in which a plurality of image data are combined for each sending destination out of a plurality of image data having the same sending destination and the screen layout in which they come close to each other. The CPU 101 stores the combined image data in the RAM 103, and the process shifts to step S409.

In step S409, the CPU 101 sends, to the destination projector, layout setting information capable of displaying the image data separated in step S407 or combined in step S408.

After that, the CPU 101 sends the respective image data to the destination projector (step S410). If a program end instruction is input upon completion of sending the respective image data, the process ends (S411). If a program end instruction is not input, the process shifts to step S412 to wait for updating of image data output from the display control unit 110. If the image data is updated, the process returns to step S401 to capture image data of the monitor again from the VRAM 108.

Image display processing in a projector 20 is the same as those in FIGS. 4A and 4C except for processing in FIG. 4B.

Fourth Embodiment

As the fourth embodiment, layout change processing when a projector 20 receives image data from a plurality of PCs will be explained. In the fourth embodiment, even when image data are received from a plurality of PCs, if a predetermined condition is satisfied, the projector changes the screen layout to combine the respective images, like a projection screen 600 as shown in FIGS. 6A to 6D. Note that processing shown in FIG. 9 corresponds to that in FIG. 4B, and is executed by expanding, by a CPU 201 in a RAM 203, a firmware program stored in a ROM 202 when the projector 20 is turned on.

The block arrangement of an image display system which implements the fourth embodiment is the same as that in the above-described first embodiment, and a description thereof will not be repeated. Processes in PCs 10 to 12 are the same as those in FIGS. 3A and 3B. Image display processing in the projector 20 is the same as those in FIGS. 4A and 4C except for processing in FIG. 4B.

Figure 9:
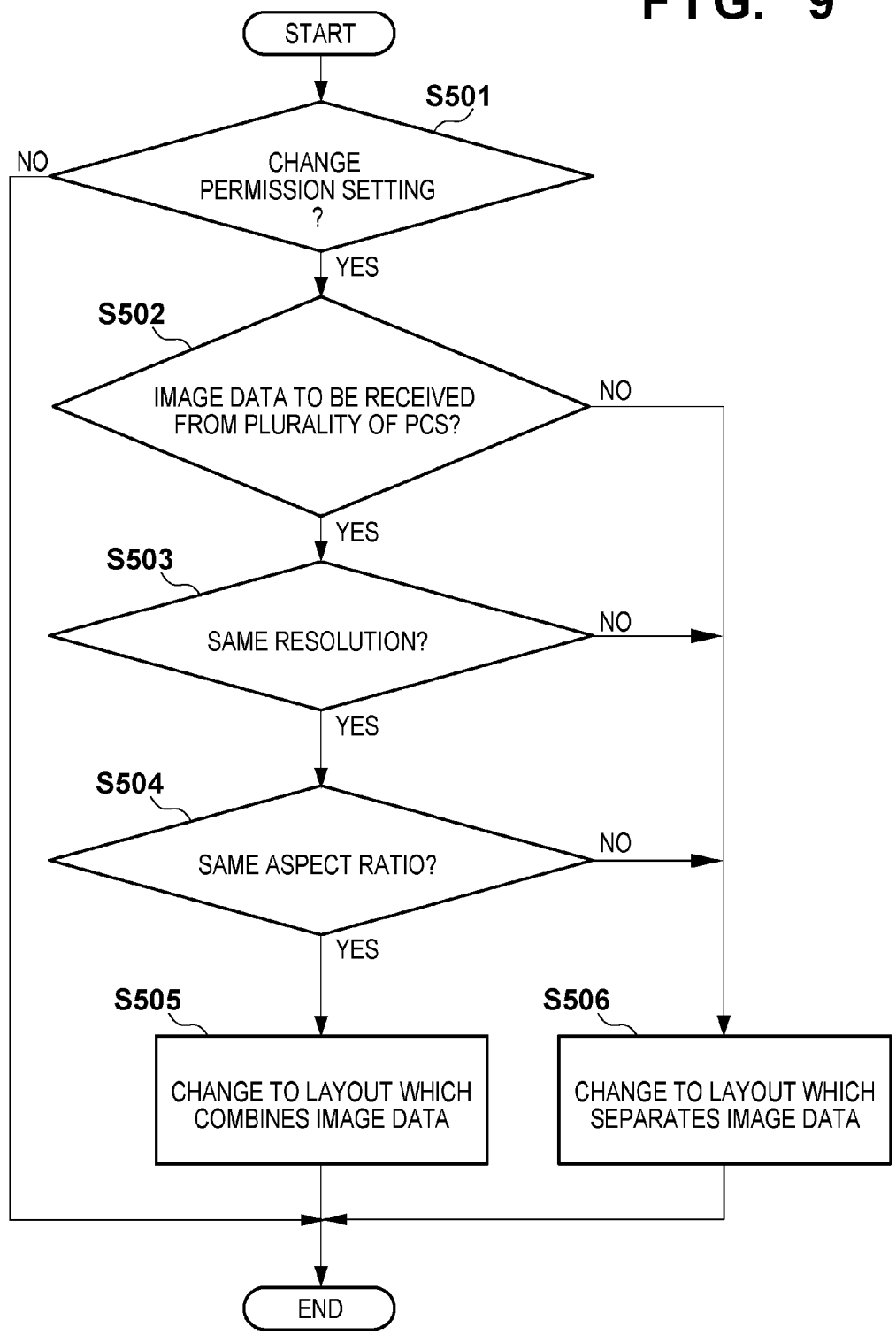
FIG. 9 is a flowchart showing processing on the projector side in an image display system according to the fourth embodiment.

Referring to FIG. 9, the CPU 201 determines whether a change permission setting is made so that an existing layout setting in the projector 20 can be automatically changed to a layout received from the PC (step S501). If a change permission setting is made, the process shifts to step S502. If a change inhibition setting is made, the CPU 201 projects image data received from the PC in accordance with a screen layout set in the projector 20 in FIG. 4C.

In step S502, the CPU 201 determines whether to receive image data from a plurality of PCs which have established connections with the projector 20. In this case, the determination is made from the image information received in step S205 of FIG. 4A.

If the CPU 201 determines in step S502 to receive image data from a plurality of PCs, the process shifts to step S503; if NO, to step S506.

In step S503, the CPU 201 determines whether the respective image data to be received from a plurality of PCs have the same resolution. If the respective image data have the same resolution, the process shifts to step S504; if NO, to step S506.

In step S504, the CPU 201 determines whether the respective image data to be received from a plurality of PCs have the same screen aspect ratio. If the respective image data have the same aspect ratio, the process shifts to step S505; if NO, to step S506.

In step S505, the CPU 201 reads out, from the RAM 203, screen layout information set in advance by the user and changes it to a screen layout which combines a plurality of image data.

In step S506, the CPU 201 reads out, from the RAM 203, screen layout information set in advance by the user and changes it to a screen layout which identifiably separates a plurality of image data.

Image display processing in the projector 20 is the same as those in FIGS. 4A and 4C except for processing in FIG. 4B.

As described above, according to the above embodiments, when projecting a plurality of images on the projection screen of a projector, a layout which combines images is set for highly relevant images such as images displayed on a plurality of monitors of the same PC. To the contrary, a layout which identifiably separates images by a frame or line is set for less relevant images such as images displayed on respective PCs. In this way, the display form is changed in accordance with the relevance between images, improving visibility.

Other Embodiment

Apparently, the present invention can be accomplished by supplying an apparatus with a storage medium in which a software program code which implements the functions of the above exemplary embodiments is stored. In this case, a computer (or central processing unit (CPU) or micro-processor unit (MPU)) including a control unit of the apparatus supplied with the storage medium reads out and executes the program code stored in the storage medium.

In this case, the program code itself read from the storage medium implements the functions of the above exemplary embodiments. Thus, the program code itself and the storage medium in which the program code is stored constitute the present invention.

For example, a flexible disk, a hard disk, an optical disk, a magneto-optical disk, a compact disc read-only memory (CD-ROM), a compact disc recordable (CD-R), a magnetic tape, a nonvolatile memory card, and a ROM can be used as the storage medium for supplying the program code.

In addition, apparently, the above case includes a case where a basic system or an operating system (OS) or the like which operates on the computer performs a part or all of processing based on instructions of the above program code and where the functions of the above exemplary embodiments are implemented by the processing.

Besides, the above case also includes a case where the program code read out from the storage medium is written to a memory provided on an expansion board inserted into a computer or to an expansion unit connected to the computer, so that the functions of the above exemplary embodiments are implemented. In this case, based on instructions of the program code, a CPU or the like provided in the expansion board or the expansion unit performs a part or all of actual processing.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (for example, computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims the benefit of Japanese Patent Application No. 2010-247835, filed Nov. 4, 2010, which is hereby incorporated by reference herein in its entirety.

What is claimed is:

1. A display control apparatus which controls to display image data sent from at least one information processing apparatus via a communication line, on a screen, comprising:
a communication interface configured to communicate with the at least one information processing apparatus via the communication line;
a CPU configured to perform functions of a determination unit, a layout change unit, and a display control unit:
wherein the image data correspond to image data displayed on respective monitors of information processing apparatuses or image data displayed on a plurality of monitors of a single information processing apparatus, and
wherein when the display control unit displays on a single screen a plurality of image displaying areas, each image displaying area displaying images displayed on each of the monitors, the determination unit determines which of (1) the plurality of image data which correspond to the images displayed on each of the monitors are sent from the same information processing apparatus and (2) the plurality of image data which correspond to the images displayed on each of the monitors are sent from different information processing apparatuses, and
the layout change unit sets a first layout of the image displaying areas for displaying the plurality of image data received by the communication interface when the determination unit determines that (1) the plurality of image data which correspond to the images displayed on each of the monitors are sent from the same information processing apparatus, and sets a second layout of the image displaying areas different from the first layout for displaying the plurality of image data received by the communication interface when the determination unit determines that (2) the plurality of image data which correspond to the images displayed on each of the monitors are sent from the different information processing apparatuses, and
the display control unit displays the plurality of image displaying areas on the screen in a layout changed by the layout change unit.

2. The apparatus according to claim 1, wherein
the first layout is a layout which combines the plurality of image displaying areas, and
the second layout is a layout which identifiably separates the plurality image displaying areas.

3. The apparatus according to claim 2, wherein
the display control unit displays the plurality of image displaying areas on the screen in accordance with layout setting information of the plurality of image data captured from the information processing apparatus, and
when the plurality of image data are data received from the same information processing apparatus, the layout change unit sets a layout which combines the plurality image displaying areas, regardless of the layout setting information.

4. The apparatus according to claim 3, further comprising:
the CPU configured to perform functions of a layout determination and a size determination unit:
the layout determination unit configured to determine, from the layout setting information, whether a layout in which the plurality of image data come close to each other at a predetermined interval is set; and
the size determination unit configured to determine whether sizes of the plurality of image data are equal,
wherein even when the plurality of image data are received from the same information processing apparatus, the layout determination unit determines that the layout in which the plurality of image data come close to each other at a predetermined interval is set, and the plurality of image data are different, if the size determination unit determines that the sizes of the plurality of image data are equal, the layout change unit sets the layout which combines the respective image displaying areas, regardless of the layout setting information.

5. The apparatus according to claim 4, further comprising:
the CPU configured to perform functions of a resolution determination unit and an aspect ratio determination unit:
the resolution determination unit configured to determine whether resolutions of the plurality of image data are equal; and
the aspect ratio determination unit configured to determine whether screen aspect ratios of the plurality of image data are equal,
wherein even when the plurality of image data are received from the same information processing apparatus, the layout determination unit determines that the layout in which the plurality of image data come close to each other at a predetermined interval is set, and the plurality of image data are different, if the resolution determination unit determines that the resolutions of the plurality of image data are equal, and the aspect ratio determination unit determines that the screen aspect ratios of the plurality of image data are equal, the layout change unit sets the layout which combines the respective image displaying areas, regardless of the layout setting information.

6. The apparatus according to claim 4, further comprising resize unit configured to resize the plurality of image data to the same size when the size determination unit determines that the sizes of the plurality of image data are different.

7. The apparatus according to claim 4, wherein when the plurality of image data are received from a plurality of information processing apparatuses and the size determination unit determines that the sizes of the plurality of image data are equal, the layout change unit sets the layout which combines the respective image displaying areas, regardless of the layout setting information.

8. The apparatus according to claim 2, wherein when a layout which combines the respective image displaying areas is set, the layout change unit displays a frame around an entire outer edge of a plurality of image displaying areas to be combined, and when a layout which identifiably separates the respective image displaying is set, displays a frame around an outer edge of each image displaying area.

9. The apparatus according to claim 2, wherein when a layout which identifiably separates the respective image displaying areas is set, the layout change unit displays a partition line between the separated plurality of image displaying areas.

10. The apparatus according to claim 1, wherein in the first layout, layout positions of the plurality of image displaying areas are closer to each other than in the second layout.

11. The apparatus according to claim 1, wherein when the plurality of image data are data received from the same information processing apparatus, the layout change unit displays, near each image displaying area, identification information of a monitor of a sending information processing apparatus.

12. The apparatus according to claim 1, wherein when the plurality of image data are data received from a plurality of information processing apparatuses, the layout change unit displays, near each image displaying area, identification information of an information processing apparatus which sends the data.

13. The apparatus according to claim 1, wherein, in the second layout, the plurality of image displaying areas are separated by a predetermined number of pixels.

14. The apparatus according to claim 1, wherein the plurality of image displaying areas are combined into one image displaying area when the plurality of image data come close to each other at a predetermined interval.

15. An image display system comprising at least one information processing apparatus and a display control apparatus which are connected via a communication line and controls to display image data sent from the at least one information processing apparatus via the communication line, on a screen,
the information processing apparatus including:
a first communication interface configured to communicate with the display control apparatus connected via the communication line;
a first CPU configured to perform functions of an image capturing unit, a first determination unit, and a layout setting unit:
wherein the image capturing unit captures respective image data displayed on a plurality of monitors, wherein the image data correspond to image data displayed on the respective monitors of information processing apparatuses or image data displayed on the plurality of monitors of a single information processing apparatus;
the first determination unit determines the display control apparatus as a sending destination of each image data captured by the image capturing unit; and
the layout setting unit determines a layout for displaying each image data in each display control apparatus serving as the sending destination,
wherein the first communication interface sends, to the display control apparatus determined as the sending destination by the first determination unit, both of each image data captured by the image capturing unit and layout setting information set by the layout setting unit, and
the display control apparatus including:
a second communication interface configured to communicate with the information processing apparatus via the communication line;
a second CPU configured to perform functions of a second determination unit, a layout change unit, and a display control unit:

wherein when the display control apparatus displays on a single screen a plurality of image displaying areas, each image displaying area displaying images displayed on each of the monitors, the second determination unit determines which of the plurality of image data which correspond to images displayed on each of the monitors are sent from the same information processing apparatus and which of the plurality of image data which correspond to images displayed on each of the monitors are sent from a plurality of information processing apparatuses;

the layout change unit sets a first layout of the image displaying areas for displaying the plurality of image data regardless of the layout setting information when the first determination unit determines that the plurality of image data which correspond to images displayed on each of the monitors are sent from the same information processing apparatus, and sets a second layout of the image displaying areas different from the first layout for displaying the plurality of image data when said second determination unit determines that the plurality of image data which correspond to images displayed on each of the monitors are sent from the plurality of information processing apparatuses; and the display control unit displays the plurality of image displaying areas on the screen in a layout changed by the layout change unit.

16. A control method of a display control apparatus which controls to display image data sent from at least one information processing apparatus via a communication line, on a screen, wherein the image data correspond to image data displayed on respective monitors of information processing apparatuses or image data displayed on a plurality of monitors of a single information processing apparatus, the method comprising:

communicating with the at least one information processing apparatus via the communication line;

determining, when the display control apparatus displays on a single screen a plurality of image displaying areas, each image displaying area displaying images displayed on each of the monitors, which of (1) the plurality of image data which correspond to images displayed on each of the monitors are sent from the same information processing apparatus and (2) the plurality of image data which correspond to images displayed on each of the monitors are sent from different information processing apparatuses;

setting a first layout of the image displaying areas for displaying the plurality of image data when (1) the plurality of image data which correspond to images displayed on each of the monitors are sent from the same information processing apparatus, and set a second layout of the image displaying areas different from the first layout for displaying the plurality of image data when (2) the plurality of image data which correspond to images displayed on each of the monitors are sent from the different information processing apparatuses; and displaying the plurality of image displaying areas on the screen in the determined layout.

* * * * *

UNITED STATES PATENT AND TRADEMARK OFFICE
CERTIFICATE OF CORRECTION

| | |
|---|---|
| PATENT NO. | : 9,294,747 B2 |
| APPLICATION NO. | : 13/272321 |
| DATED | : March 22, 2016 |
| INVENTOR(S) | : Akihiro Tanabe |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 726 days.

Signed and Sealed this
Twenty-sixth Day of July, 2016

Michelle K. Lee
*Director of the United States Patent and Trademark Office*